United States Patent [19]

Yealy

[11] 4,140,569

[45] Feb. 20, 1979

[54] APPARATUS FOR PRODUCING PLASTIC CAULKING CARTRIDGES

[75] Inventor: Carl F. Yealy, New Oxford, Pa.

[73] Assignee: Sonoco Products Company, Hanover, Pa.

[21] Appl. No.: 804,959

[22] Filed: Jun. 9, 1977

[51] Int. Cl.² .................. B29C 27/08; B32B 31/00
[52] U.S. Cl. .................................. 156/580; 156/69; 156/73.5; 156/267
[58] Field of Search .............. 156/73.5, 580, 267, 156/69

[56] References Cited

U.S. PATENT DOCUMENTS

| | | | |
|---|---|---|---|
| 2,933,428 | 4/1960 | Mueller | 156/73.5 |
| 3,446,688 | 5/1969 | Flax | 156/73.5 |
| 3,607,581 | 9/1971 | Adams | 156/580 |
| 3,726,749 | 4/1973 | Mistarz et al. | 156/580 |
| 3,982,980 | 9/1976 | van Manen | 156/73.5 |

Primary Examiner—Douglas J. Drummond
Attorney, Agent, or Firm—Seidel, Gonda & Goldhammer

[57] ABSTRACT

An apparatus for producing plastic caulking cartridges is disclosed. The apparatus includes a support having a plurality of work stations disposed about it. A mechanism feeds plastic cylindrical tubes to the support and an indexing plate intermittently moves the tubes to the work stations. A plastic spout is fed to a spin welding station, and is spin welded to a tube. The spout welded to the tube thus forms a cartridge. The cartridge is moved to a trimming station where a trimmer cuts off the flash produced during the spin welding operation. Thereafter, the cartridge is conveyed to a dispensing station and the cartridge is dispensed from the work table.

29 Claims, 11 Drawing Figures

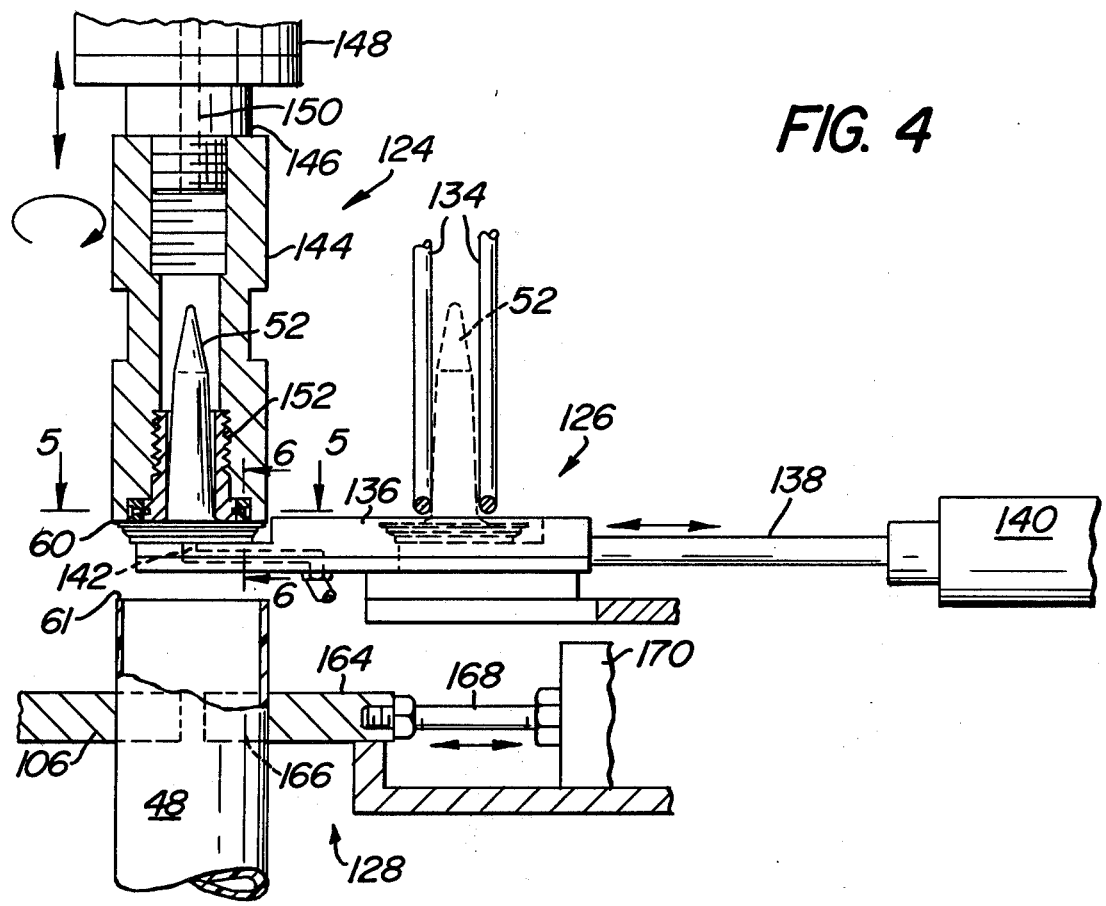
FIG. 4
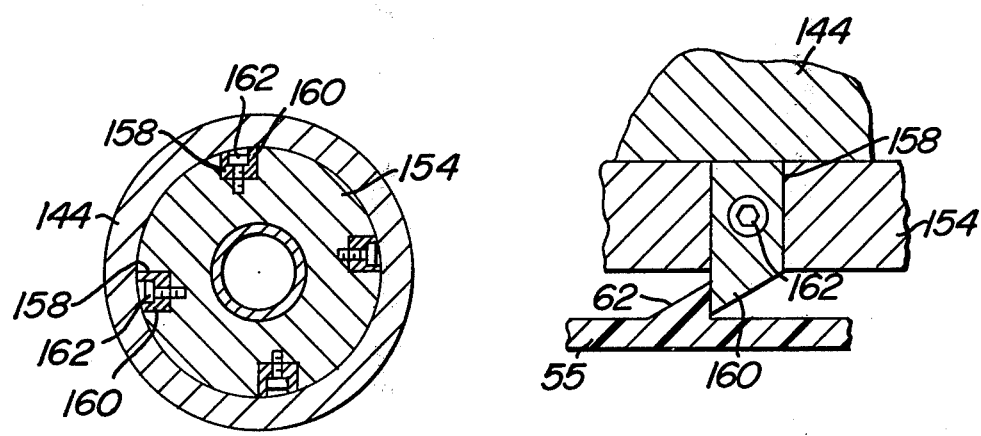
FIG. 5
FIG. 6

APPARATUS FOR PRODUCING PLASTIC CAULKING CARTRIDGES

BACKGROUND OF THE INVENTION

The apparatus of the present invention relates to the mass production of all plastic cartridges. Cartridges of the type produced by the present invention are used to store and dispense various types of caulking or adhesive substances. Until recently, a majority of such cartridges have been formed of wound paper tubes with either metal or plastic spouts. The present invention is designed to produce all plastic cartridges.

SUMMARY OF THE INVENTION

The apparatus of the present invention is comprised of a plurality of work stations. A means moves plastic tubes to the individual work stations. A means for feeding the plastic tubes to the moving means is provided. At one work station, there is located a means for spin welding a plastic spout to a plastic tube in order to produce a cartridge. A means is provided for supplying plastic spouts to the spin welding means. At another work station, a trimming means trims off the flash produced during the spin welding operation. A dispensing means thereafter dispenses the cartridge.

In a preferred embodiment, the tubes are fed to a support plate or work table in pairs. A rotatable indexing plate intermittently moves pairs of tubes to the various work stations. A reciprocating transfer arm dispenses a spout to a first spin welding work station and the indexing plate transfers a pair of tubes to the first spin welding station.

At the first spin welding station, a weld head moves downwardly toward a spout on the distal end of the transfer arm. A vacuum applied to the interior of the weld head holds the spout to the weld head and the transfer arm moves out of alignment with the weld head. The weld head thereafter begins to rotate and moves downwardly toward a tube. The tube is disposed in axial alignment with the weld head and spout and is held against rotation during the spin welding operation by a clamp.

Each spout has a base portion and a nozzle portion extending outwardly from the center of the base. A plurality of ratchet teeth extend from the base. Similarly, the weld head has a plurality of ratchet teeth extending from it which are adapted to engage the ratchet teeth of the spout. In this manner, the spout is rotated with the weld head during the spin welding operation.

After the spout has been welded to the tube and the cartridge is formed, the clamping means releases the tube and the indexing plate conveys the cartridge and the remaining tube of the pair to a second spin welding station. At the second spin welding station, a similar spin welding operation is performed on the remaining tube and another spout. In this manner, a pair of cartridges is formed.

The indexing plate, thereafter, conveys the pair of cartridges to a trimming station. A clamp mechanism holds the cartridges by their tube sections and rotary trimmers encircle the cartridges. The trimmers have cutting edges which trim the flash that extends outwardly from the cartridge in the area of the weld between each spout and tube.

The pair of cartridges is thereafter conveyed by the indexing plate to a dispensing station. At the dispensing station, the pair of cartridges fall through a pair of holes in the work table to a take-away conveyor. The take-away conveyor is an endless belt having a plurality of projections. The opened end of the cartridges is received about the projections and the conveyor moves the cartridges away from the work table for further processing or packaging.

A plurality of spaced cut-outs are formed in the indexing plate for receiving and moving the pairs of tubes and cartridges. In a typical indexing plate, eight pairs of cut-outs can be provided. The apparatus is thus adapted to continuously produce cartridges at a high rate of speed.

It is an object of the present invention to provide an apparatus for mass producing plastic caulking cartridges.

It is another object of the present invention to provide a spin welding mechanism wherein plastic spouts are positively driven by a weld head so as to accurately weld the spout to a cylinder body.

It is another object of the present invention to automate the process of producing plastic caulking cartridges in order to prevent the contamination of the welds.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 4 is an enlarged view taken along line 4—4 of FIG. 2 illustrating a spin welding station.

FIG. 5 is an enlarged view taken along line 5—5 of FIG. 4 illustrating a weld head with a plurality of ratchet teeth secured thereto.

FIG. 6 is an enlarged view taken along line 6—6 of FIG. 4 illustrating in detail a ratchet tooth of the weld head mating with a ratchet tooth of a spout.

DETAILED DESCRIPTION OF THE INVENTION

Figure 1:
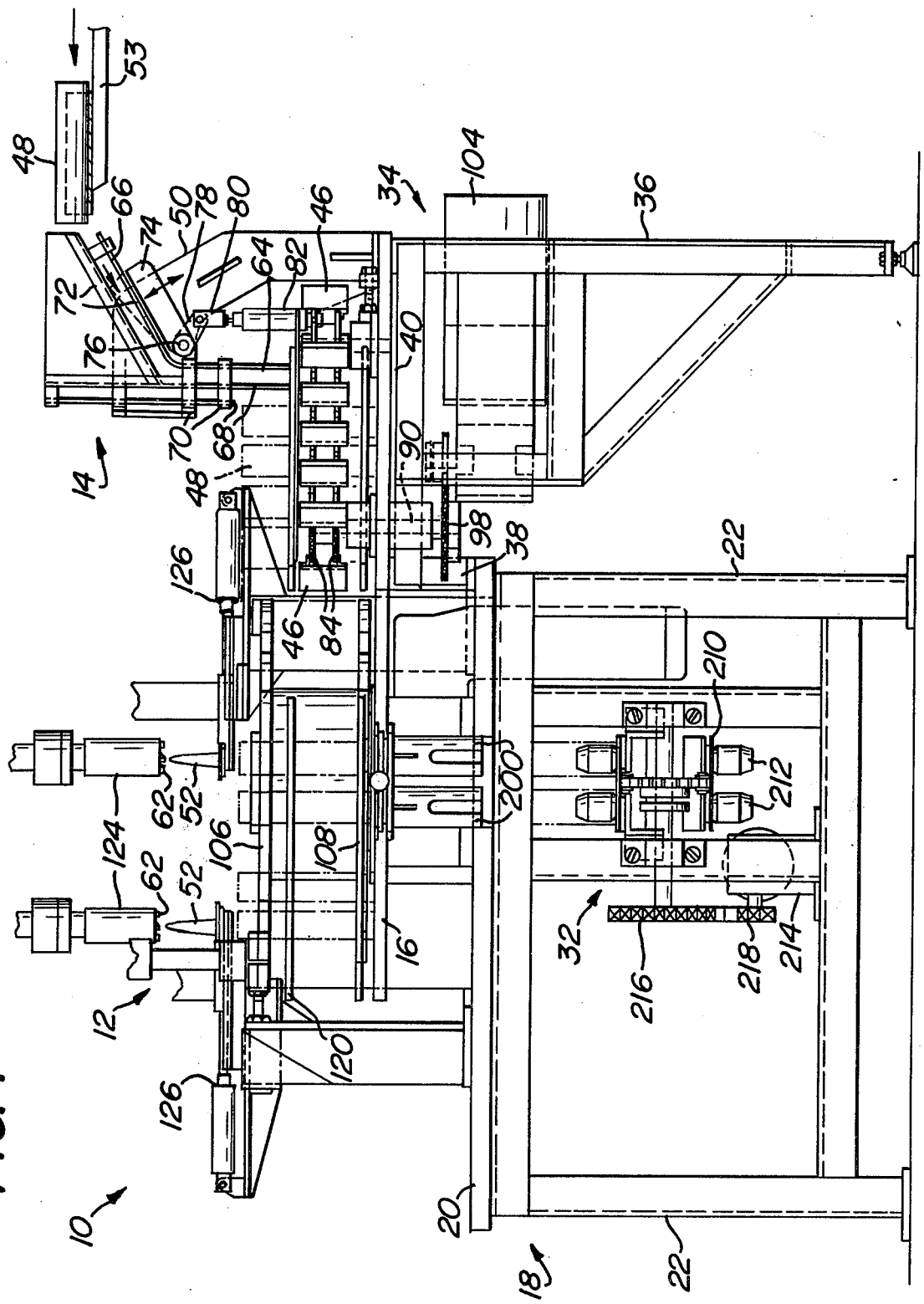
FIG. 1 is a front elevational view of an apparatus in accordance with the present invention.

Referring to the drawings in detail wherein like numerals indicate like elements, there is shown in FIG. 1 an apparatus in accordance with the present invention designated generally as 10. The apparatus 10 has a processing section 12 to the left of FIG. 1 and a feeding section 14 to the right of FIG. 1.

The processing section 12 includes a work table or support plate 16. The support plate 16 is attached to a supporting frame 18. The supporting frame 18 is comprised of a horizontal supporting surface 20 and a plurality of vertically extending legs 22.

Figure 2:
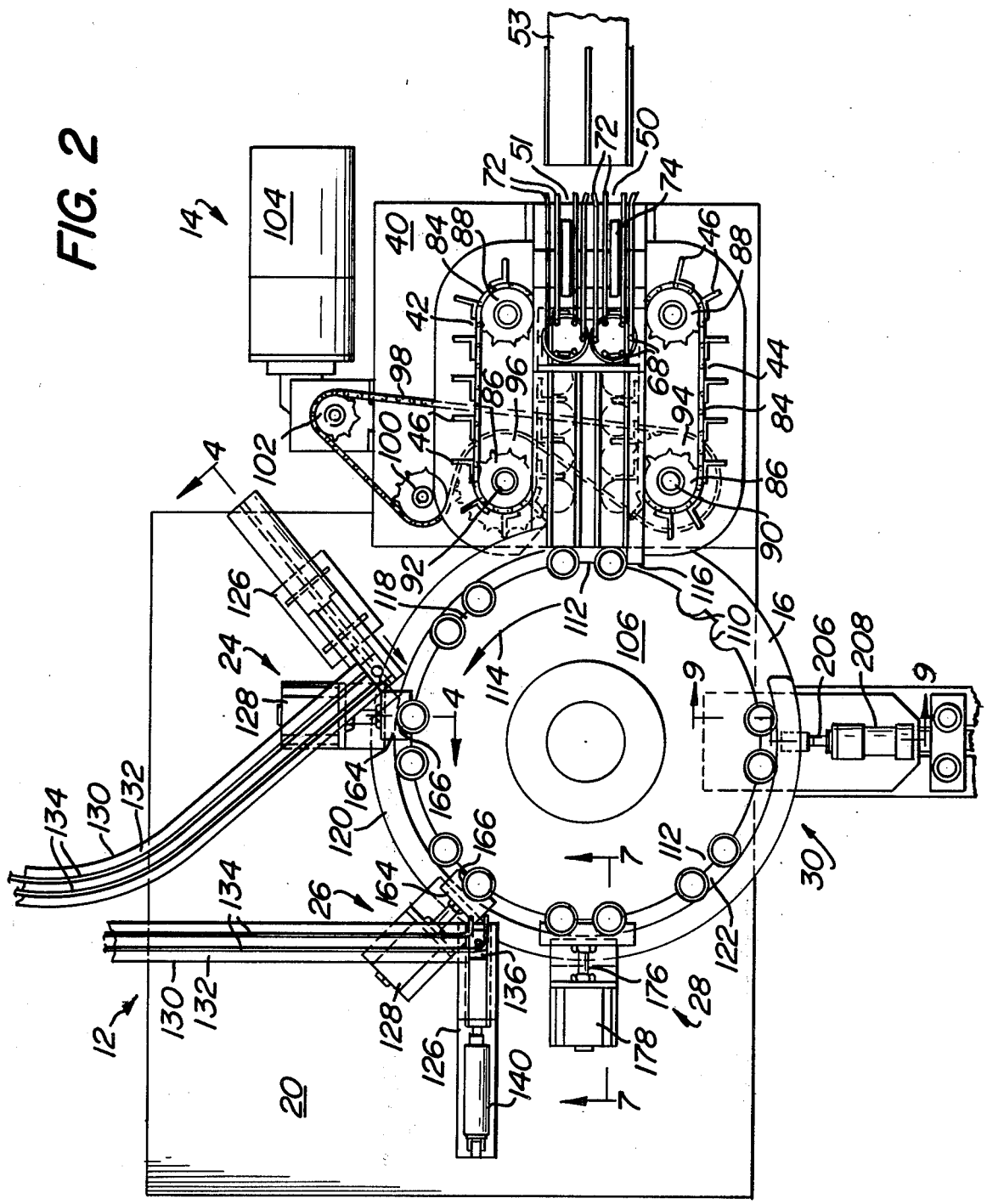
FIG. 2 is a top plan view of the apparatus.

A plurality of work stations are disposed about the perimeter of the support plate 16. As best seen in FIG. 2, the support plate 16 is preferably circular in configuration. The work stations include a first spin welding station 24, a second spin welding 26, a trimming station 28, and a dispensing station 30. A take-away conveyor 32 is disposed below the dispensing station 30.

The feeding section 14 includes a supporting frame 34. The frame 34 is comprised of vertically extending legs 36 which rest upon the ground and vertically extending legs 38 which rest upon the horizontal surface 20 of the supporting frame 18. A horizontal support surface 40 extends between the legs 36, 38.

A pair of endless belt type conveyor mechanisms 42, 44 are supported upon the surface 40. Each conveyor mechanism 42, 44 has a plurality of vertically extending cleats 46. A plastic cylindrical tube 48 is received between adjacent cleats 46 and is conveyed in a vertical or upright disposition toward the support plate 16.

Transfer mechanisms 50, 51 transfer the tubes 48 from supply conveyors 53 to the conveying mechanisms 42, 44. The conveyors 53 can be of any conventional type and preferably move the tubes 48 in a horizontal disposition.

The tubes 48 are preferably extruded from a high density polyethylene so that they have a uniform inner diameter. This is accomplished by extruding a tube having a uniform continuous wall thickness. Initially, the tube is extruded oversize and then drawn down to a desired inner diameter by passing the tube through an outer extruder. In this manner, a uniform inner diameter through the entire axial length of the tube is assured. In a preferred embodiment, the tube has a 1.843 inch inner diameter and the wall is 0.050 inch thick.

The tubes are thereafter cut to a desired length and conveyed to an accumulator. The accumulator is provided so that the extrusion operation can be run continuously even if other portions of the cartridge production process become stalled. From the accumulator, the tubes 48 are carried by the conveyors 53 to the transfer mechanisms 50, 51.

The transfer mechanisms 50, 51 are identical to one another as are the conveyor mechanisms 42, 44. Only one conveyor mechanism 44 and one transfer mechanism 50 will be described, with like elements indicated by like numerals.

The tubes 48 are supplied to the transfer mechanism 50 by the conveyor 53. The transfer mechanism 50 includes a vertical conduit 64 and a guide chute 66. The guide chute 66 transfers a tube 48 from the conveyor 53 to the vertical conduit 64. The vertical conduit 64 in turn transfers the tube 48 to the conveyor mechanism 44.

A plurality of vertically extending rods 68 are arranged in a circular disposition to form the vertical conduit 64. The rods 68 are secured to the inner circumference of annular plates 70. A plurality of the rods 68 have extensions 72 which are angled relative to the horizontal and form the guide chute 66. A reciprocal finger 74 is movable between a pair of the lowermost extensions 72 which form spaced guide rails upon which the tubes 48 slide. The finger 74 blocks the guide chute 66 to prevent a tube 48 from entering the vertical conduit 64. The finger 74 is intermittently reciprocated to allow one tube 48 at a time to enter the vertical conduit 64. The finger 74 is fixedly secured to a rotatable shaft 76. See FIG. 1. A link 78 is also fixedly secured at one of its ends to the shaft 76. The other end of link 78 is pivotably secured to a piston rod 80. A pneumatic cylinder 82 moves the piston rod 80 to thereby pivot the link 78 and rotate the finger 74 between its blocking and open position.

The conveyor mechanism 44 includes a pair of horizontally disposed chains 84. The cleats 46 are attached to the chains 84. The chains 84 of conveyor mechanism 44 are spaced vertically from one another. Each chain 84 is carried by and received about a pair of sprocket wheels 86, 88. See FIG. 2.

The sprocket wheels 86 of conveyor mechanism 44 are fixedly secured to a shaft 90 and the sprocket wheels 86 of conveyor mechanism 46 are fixedly secured to a shaft 92. A driven sprocket wheel 94 is fixedly secured to the shaft 90 below the sprocket wheels 86. A driven sprocket wheel 96 is fixedly secured to the shaft 92 below the sprocket wheels 86. An endless chain 98 is received about and coupled to the sprocket wheels 94, 96. The chain 98 is also received about idler sprocket 100 and drive sprocket 102. The drive sprocket 102 is driven intermittently by way of a conventional clutch and brake mechanism connecting the sprocket 102 to a motor 104.

The motor 104 thus drives the endless chain 98 which in turn drives the chains 84 of both conveyor mechanisms 42, 44. The endless chain 98 is wound about the sprockets 94, 96 in such a manner that conveyors mechanisms 42, 44 are driven at the same rate of speed and in the same direction. The rate at which finger 74 is reciprocated is coordinated with the speed at which motor 104 drives the conveyor mechanisms 42, 44 so that a single tube 48 is received between each pair of adjacent cleats 46. The conveyor mechanisms 42, 44 are arranged parallel and adjacent to one another in order to convey the tubes 48 in pairs to the support plate 16.

An upper indexing plate 106 and a lower indexing plate 108 receive the pairs of tubes 48 from the conveyor mechanisms 42, 44 and move the pairs of tubes 48 to the various work stations. The bottom longitudinal ends of the tubes 48 are slidably carried on the support plate 16. A conventional motive power source (not shown) is utilized to intermittently rotate the indexing plates 106, 108. Each indexing plate 106, 108 is generally circular in configuration and has a plurality of semicircular cutouts 110 formed in its perimeter. The cutouts 110 are formed in a plurality of spaced pairs 112.

As best seen in FIG. 2, a pair of cutouts 112 receives a pair of tubes 48 from the conveyor mechanisms 42, 44 at a receiving station 116. The indexing plates 106, 108 are intermittently rotated in a counterclockwise direction as shown by arrow 114. A pair of tubes 48 is moved by the indexing plates 106, 108 to a first idle station 118. An annular ring 120 is disposed radially outward of and at a vertical level between the plates 106, 108. The annular ring 120 serves to retain the tubes 48 within the cutouts 110 while the tubes 48 are being moved.

A pair of tubes 48 is moved to the first idle station 118 and then to the first spin welding station 24. At the first spin welding station 24, a spout 52 is spin welded to one of the pair of tubes 48 to thereby form a cartridge. Thereafter, the pair which now includes one tube 48 and one cartridge is moved to the second spin welding station 26. At the second spin welding station 26, another spout 52 is spin welded to the other tube 48 of the pair to form another cartridge. Thereafter, the pair of cartridges is moved to the trimming station 28 at which the flash formed during the spin welding process is trimmed from both of the cartridges. The pair of cartridges thereafter moves to a second idle station 122 and finally to the dispensing station 30.

Figure 11:
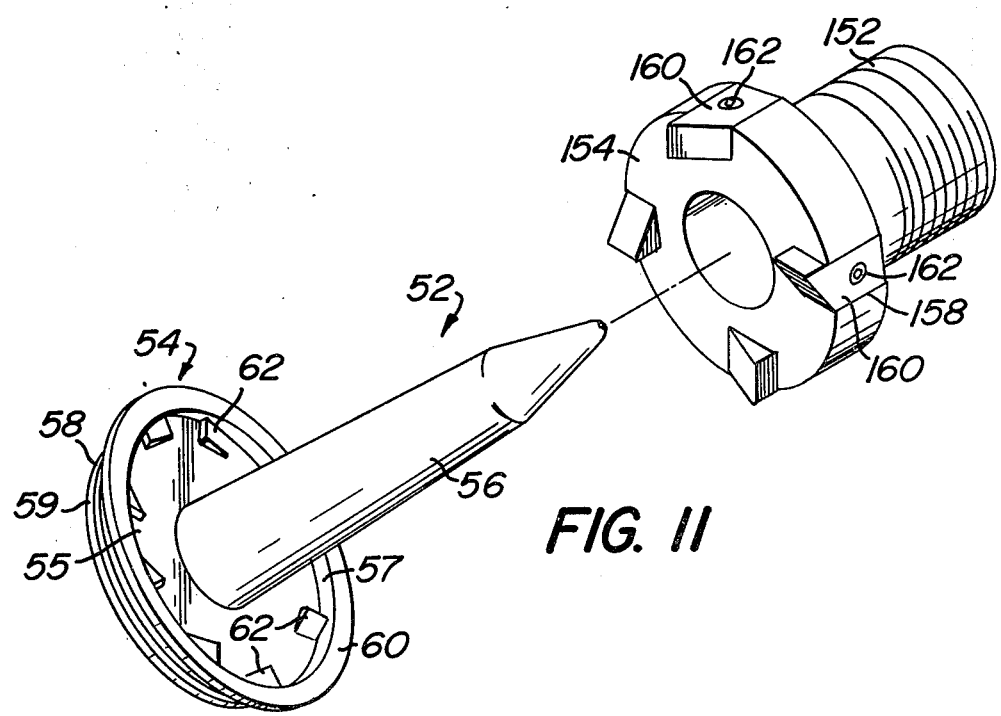
FIG. 11 is an enlarged perspective view of a spout and a weld head adaptor illustrating their respective ratchet teeth.

A spout 52 is shown in detail in FIG. 11. The spouts 52 are injection molded and conveyed to the first and second spin welding stations 24, 26. Each spout 52 has a base portion 54 and a nozzle portion 56.

The base portion 54 is formed of a circular disc 55 which supports a plurality of ratchet teeth 62. A shoulder 60 is supported above and connected to the disc 55 by an annular ring 57. An annular neck 58 extends below the disc 55 and is coaxial with the longitudinal axis of the nozzle portion 56. The annular neck 58 is sized so that its outermost circumferential surface 59 interference fits with the inner wall of a tube 48. The shoulder 60 extends radially outward of the circumferential surface 59. When a cartridge is formed, the annular neck 58 is secured within the interior of a tube 48 and the bottom surface of a shoulder 60 is secured to a top circular surface 61 of a tube 48. See FIG. 4.

The spin welding stations 24, 26 are similarly constructed. A description of only one spin welding station 24 will therefore be provided with like elements indicated by like numerals.

The details of spin welding station 24 are shown in FIGS. 4, 5 and 6. The spin welding station 24 has a weld head 124 for holding and spinning a spout 52, a transfer mechanism 126 for transferring a spout 52 from a supply source to the weld head 124, and a clamping mechanism 128 for holding a tube 48 against rotation during the spin welding operation.

The spouts 52 are fed to the transfer mechanism 126 from a supply source (not shown) by a ramp 130. See FIG. 2. The ramp 130 includes a plate 132 upon which the base 54 of the spouts 52 is slideably carried. The spouts 52 are guided and held in an upright position on the plate 132 by a pair of spaced parallel rods 134. The rods 134 are spaced apart from one another above the plate 132. The ramps 130 slope downwardly from a source of spouts 52. In this manner, the spouts 52 slide down the plate 132 in an upright position to the transfer mechanism 126.

A transfer arm 136 is carried on the distal end of piston rod 138. The piston rod 138 is reciprocated by a pneumatic cylinder 140. When the piston rod 138 is in its retracted position (shown in phantom lines in FIG. 4), the distal end of transfer arm 136 is aligned with the ramp 130 and a spout 52 is received thereon. The spout 52 is secured in an upright position on the transfer arm 136 by means of a vacuum applied to the interior of the spout 52. The vacuum is applied by way of a conduit 142 which communicates with a vacuum source (not shown).

When the piston rod 138 is in its extended position, the distal end of the transfer arm 136 and the spout 52 carried thereon are aligned with the weld head 124. The weld head 124 includes a cylindrical carrier 144 threaded to the end of a piston rod 146. The piston rod 146 is moved vertically by means of pneumatic cylinder 148. The piston rod 146 is rotatable driven by any suitable drive means. Rotary drive means per se are conventional and, hence, not shown in detail. A conduit 150 extends through the piston rod 146 and communicates with the hollow interior of the cylindrical carrier 144. The conduit 150 is connected to a vacuum source (not shown). The vacuum is utilized to hold a spout 52 to the weld head 124.

The interior of the carrier 144 at its lowermost end is threaded. An adaptor 152 threads into the lowermost end of the carrier 144. The adaptor 152 is shown in detail in FIGS. 5, 6 and 11. The adaptor 152 has an annular ring section 154 and a cylinder section 156. The outer surface of the cylinder section 156 is threaded so that the adaptor 152 may screw into the lower end of the carrier 144. A plurality of indentations or cut-out sections 158 are cut radially inward into the annular ring 154. A ratchet tooth 160 is received within each of the indentations 158 and secured thereto by a suitable fastening means such as screw 162. The ratchet teeth 160, as seen in FIG. 6, are adapted to mate with the ratchet teeth 62 on the base 54 of spouts 52.

The clamping mechanism 128 includes a clamp 164 having a semi-circular surface 166 adapted to contact the outer cylindrical surface of a tube 48. The clamp 164 is carried on the distal end of a piston rod 168, which is reciprocably moved by a pneumatic cylinder 170. When the piston rod 168 is moved to its extended position, the tube 48 is frictionally held between a cutout 110 and the clamp 164.

After a spout 52 has been secured to the weld head 124 by the vacuum, the transfer arm 136 is moved away from the weld head toward its retracted position. The weld head 124 thereafter begins to rotate and move downward toward the tube 48 which is held by clamp 164. A suitable spinning speed is 3000 rpm. The specific optimum spinning speed will vary according to the ambient temperature, humidity and specific materials being used. The weld head 124 moves downwardly toward the tube initially at a first rate of speed. Within approximately 1/16 inch of the tube 48, the approach speed is changed to a second slower rate. The spout 52 is moved toward the tube 48 until the circumferential surface 59 of the spout 52 comes into frictional interference fit with the inner wall of the tube 48 and the bottom surface of the shoulder 60 contacts the top circular surface 61 of the tube 48. The weld head continues to rotate the spout 52 relative to the tube 48 for a time sufficient for heat to be generated to melt the plastic at the interface between the circumferential surface 59 and the inner wall of tube 48. The rotation of spout 52 is then stopped and the plastic is permitted to fuse along the interface.

The ratchet teeth 160 engage the ratchet teeth 62 to prevent the spout 52 from rotating relative to the cylindrical carrier 144 during the spin welding operation. The semi-circular surface 166 cooperates with the cut-out 110 to hold the tube 48 and prevent the rotation of the tube 48 during the spinwelding process.

Since the spout 52 is fixed relative to the cylindrical carrier 144 and the tube 48 is held secure during the spin welding operation, the rate of rotation of the cylindrical carrier 144 is the rate of rotation of the spout 52 relative to the tube 48. The ability to accurately control the rate of rotation between the spout 52 and the tube 48 for each cartridge produced results in uniformity and predictability of the quality of the resultant weld. As mentioned above, the optimum spinning speed varies in accordance with the ambient temperature, humidity and material used. Once an optimum spinning speed is determined for a certain set of conditions the cylindrical carrier 144 is set to rotate at such a speed. The weld produced will be uniform for all catrdiges welded under these conditions at the optimum speed. Also, since the spin welding operation is automated, the weld will not be contaminated by contact with grease or dirt from an operator's hands.

After the weld head 124 stops spinning, the vacuum holding the spout 52 to the weld head 124 is released. The cylindrical carrier 144 moves upwardly away from the spout and the clamp 164 moves away from the tube 48. A cartridge is thus formed from one of the pair of tubes 48 and a spout 52. The indexing plates 106, 108 thereafter rotate and move the cartridge and the remaining tube 48 of the pair to the second welding station 26. At the second welding station 26, a spout 52 is spin welded to the other tube 48 in the same manner as the cartridge was formed at the first spin welding station 24.

During the spin welding process, strands of the plastic material melt and spray out of the interface between the spout 52 and the tube 48. The melted strands solidify into strands or strings of plastic material around the weld junction. The solidified strands are referred to as flash. The indexing plates 106, 108 move the pair of cartridges from the second spin welding station 26 to the trimming station 28.

Figure 7:
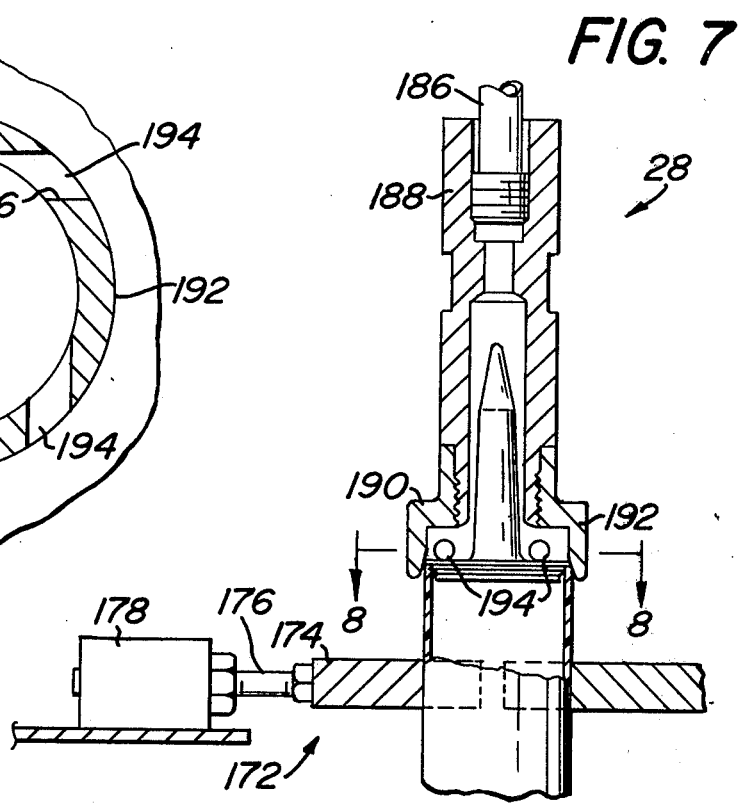
FIG. 7 is an enlarged view taken along line 7—7 of FIG. 2 illustrating a trimming station.
Figure 8:
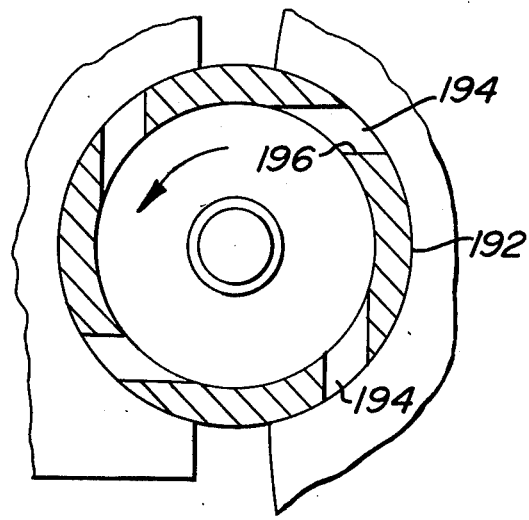
FIG. 8 is an enlarged view taken along line 8—8 of FIG. 7 illustrating the cutting edges of a trimmer.

The trimming station 28 is shown in detail in FIG. 7. A clamping mechanism 172 holds the pair of cartridges against rotation during the flash trimming operation. The clamping mechanism 172 operates similar to the clamping mechanism 128 and includes a clamp 174 attached to the end of a piston rod 176. The piston rod 176 is reciprocated by a pneumatic cylinder 178. The clamp 174 has a pair of semi-circular cut-outs adapted to contact the outer cylindrical walls of a pair of tubes 48 of the cartridges being trimmed.

The trimming station 28 includes a pair of trimming heads 182, 184. See FIG. 3. The trimming heads 182, 184 are of similar construction and, hence, only trimming head 182, as shown in FIG. 7, will be described. A rotatable shaft 186 is rotatably driven by a conventional drive mechanism (not shown). A cylindrical carrier 188 is threadedly secured to an end of the shaft 186. A trimmer 190 is threadedly secured to the lower end of the carrier 188. The trimmer 190 has a lower annular ring 192 with a plurality of holes 194 therethrough. The annular ring 192 is sized to fit around the outer circumference of the cartridge and the holes 194 form cutting edges 196 for trimming the flash from the cartridges. The trimming heads 182, 184 are moved upwardly and downwardly preferably by a pneumatic drive mechanism to permit the trimmers 190 to encircle the cartridges.

With the cartridges secured against rotation by the clamping mechanism 128, the trimming heads 182, 184 are rotated at a high speed and moved downwardly to encircle the catridges. The cutting edges 196 rotate about the welded joint between a spout 52 and a tube 48 to cut the flash extending outwardly therefrom.

After the flash has been trimmed from the cartridges, the trimming heads 182, 184 are moved to their upward position and the indexing plates 106, 108 rotate and move the cartridges to the next station, which is the second idle station 182. Thereafter, the indexing plates 106, 108 move the cartridges to the dispensing station 30.

Figure 10:
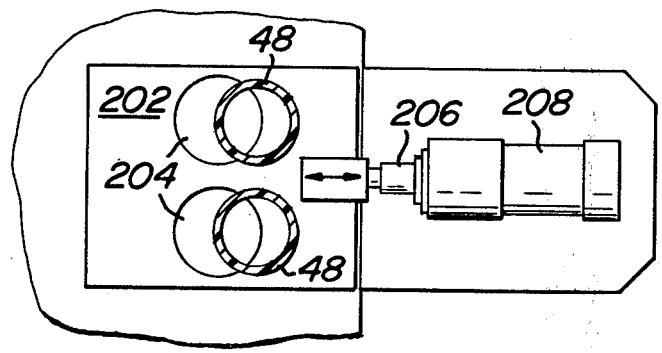
FIG. 10 is an enlarged view taken along line 10—10 of FIG. 9 illustrating a blocking plate of the trimming station in an intermediate position.
Figure 9:
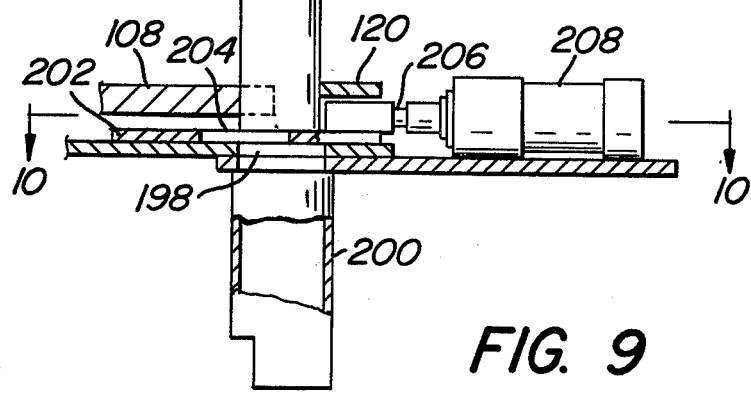
FIG. 9 is an enlarged view taken along line 9—9 of FIG. 2 illustrating a dispensing station.

The dispensing station 30 is shown in detail in FIGS. 9 and 10. A pair of holes 198 extend through the support plate 16 at the dispensing station 30. A pair of conduits 200 are coaxial with and extend below the holes 198. A blocking plate 202, having a pair of holes 204 therethrough, is provided to block the holes 198 in a blocking position and to allow the cartridges to fall through the holes 204 and 198 in a dispensing position. The plate 202 is reciprocated between its blocking and dispensing positions by a movable piston arm 206, which is moved by pneumatic cylinder 208.

Figure 3:
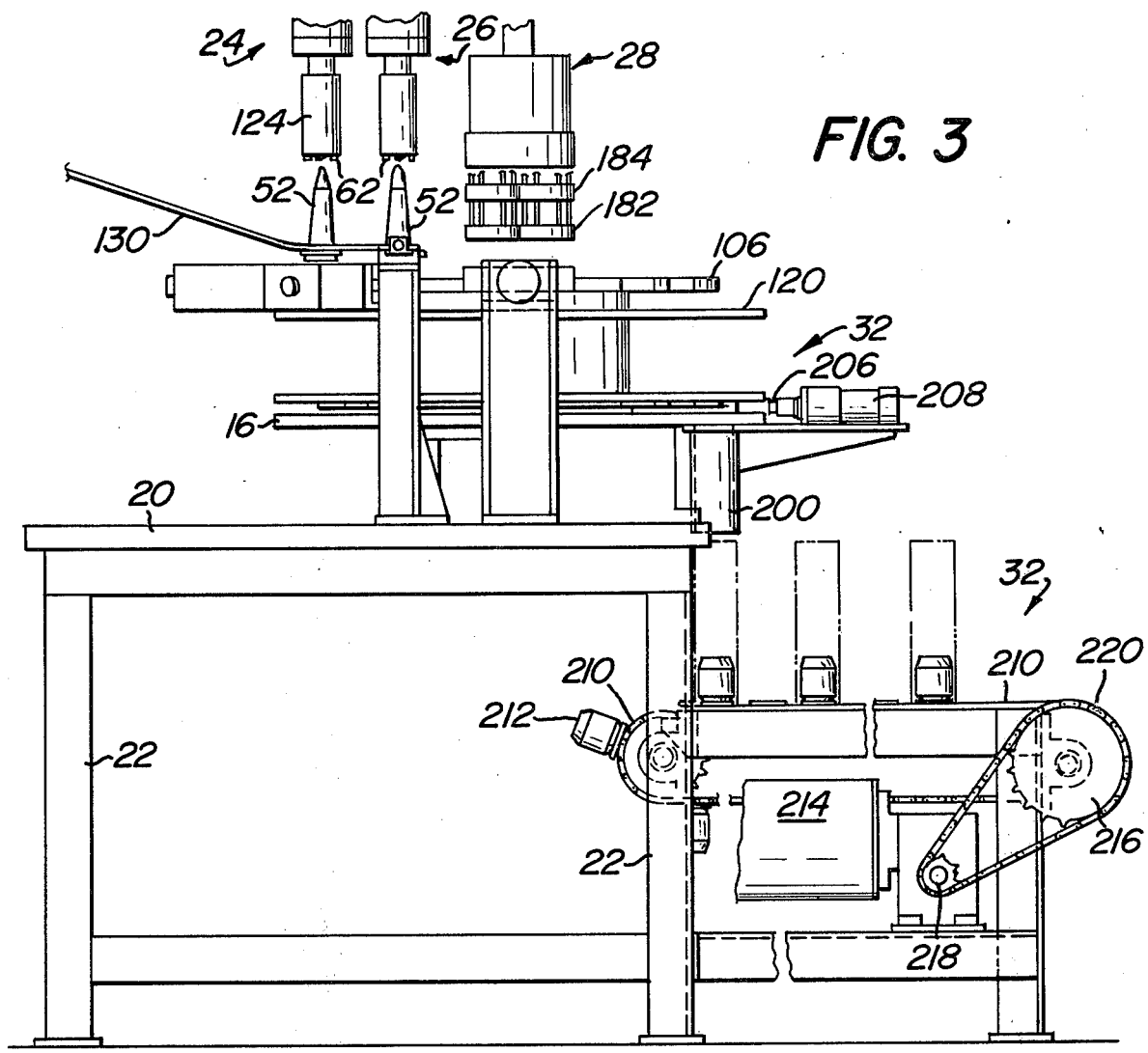
FIG. 3 is a side elevational view of the apparatus.

The pair of cartridges fall through the conduits 200 to the take-away conveyor 32. The take-away conveyor 32 includes an endless conveyor belt 210 which has a plurality of projections 212 extending outwardly therefrom. The projections 212 are arranged in spaced apart side-by-side pairs. Each pair of projections 212 is adapted to receive a pair of cartridges falling through the conduits 200. The dispensing of the cartridges through the conduits 200 is timed with the motion of the conveyor belt 210 so that the open end of each cartridge falls around and is received upon a projection 212. The conveyor belt 210 is driven intermittently by any suitable means such as motor 214 coupled to the belt 210 by way of sprockets 216, 218 and endless chain 220. The intermittent motion of the conveyor belt 210 is accomplished by coupling the motor 214 to the sprocket 218 by a conventional clutch and brake mechanism. In FIG. 3, the conveyor belt 210 is shown to be of relatively short length. The belt 210 can be made to any suitable length and can carry the cartridges to either a packaging or further processing station, such as a printing station.

The operation of the apparatus 10 can be synchronized by utilizing a plurality of microswitches and time delayed relays arranged to accomplish the desired sequence of operations. The microswitches and relays per se are conventional. The use of microswitches and relays to accomplish a sequence of operations is also known and, hence, will not be described in detail. As described above, the reciprocation of the finger 74 must be timed to dispense a single cartridge between adjacent cleats 46. The intermittent motion of the conveyor mechanisms 42, 44 must be timed to dispense pairs of tubes 48 to pairs of cut-outs 112 as a pair of cut-outs 112 aligns itself with the dispensing end of the conveyors 42, 44. Similarly, the intermittent rotation of the index plates 106, 108 must be timed with the operation of the spin welding, trimming and dispensing stations.

The present invention may be embodied in other specific forms without departing from the spirit or essential attributes thereof and, according, reference should be made to the appended claims, rather than to the foregoing specification as indicating the scope of the invention.

What is claimed is:

1. Apparatus for producing plastic caulking cartridges from plastic spouts and plastic tubes, comprising:
   a plurality of work stations;
   means for moving plastic tubes to said work stations;
   said moving means including a rotatable indexing plate;
   said indexing plate having a plurality of cutout sections adapted to receive the tubes;
   means for feeding plastic tubes to said moving means;
   means for spin welding a plastic spout to a plastic tube to form a plastic cartridge;
   said spin welding means being located at one work station;
   said spin welding means including means for clamping the outer circumferential surface of a tube at said spin welding station to prevent rotation of the tube during the spin welding process;

said clamping means including a reciprocable clamp permanently disposed adjacent said spin welding station;

means for reciprocating said clamp between a retracted position and an extended position;

said clamp in its extended position frictionally holding a tube against rotation between said clamp and a cutout section of said indexing plate;

means for supplying plastic spouts to said spin welding means;

means for trimming off flash produced during spin welding;

said trimming means being located at another work station; and means for dispensing said cartridge.

2. An apparatus in accordance with claim 1 wherein said cutout sections form means for grasping said tubes at a plurality of locations along the perimeter of said indexing plate, and means for rotating said indexing plate to move said grasped tubes to said work stations.

3. An apparatus in accordance with claim 2 wherein said moving means includes a support plate disposed below said indexing plate for slidably supporting the tubes in a vertical position upon one of their longitudinal ends, said indexing plate has a substantially circular major face, and the curved cutout sections are formed in the circumference of the indexing plate, said cutout sections being adapted to receive the tubes about their outer circumferential surfaces.

4. An apparatus in accordance with claim 1 wherein said spin welding means includes means for spinning a spout while moving the spout toward a longitudinal end of said clamped tube.

5. An apparatus in accordance with claim 4 wherein said spinning means includes a reciprocable weld head, means for reciprocating said weld head, means for rotating said weld head, and means for holding a spout to said weld head.

6. An apparatus in accordance with claim 5 wherein said weld head has a hollow interior for receiving a portion of a spout and said means for holding a spout includes means for applying a vacuum to said hollow interior.

7. An apparatus in accordance with claim 5 wherein said weld head includes at least one ratchet tooth adapted to engage a ratchet tooth on a spout.

8. An apparatus in accordance with claim 5 wherein said weld head includes a plurality of ratchet teeth adapted to engage ratchet teeth on a spout.

9. An apparatus in accordance with claim 5 wherein said spout supplying means includes a ramp, a reciprocable transfer arm, means for reciprocating said transfer arm and means for holding a spout in an upright position on said transfer arm, said ramp being adapted to transfer a spout from a spout supply to said transfer arm and said transfer arm being adapted to transfer a spout from said ramp to said weld head.

10. An apparatus in accordance with claim 9 wherein said ramp includes a base member for supporting a base portion of a spout and a pair of spaced rods disposed above said base member for guiding a nozzle portion of a spout and said means for holding a spout in an upright position on the transfer arm includes means for supplying a vacuum to said transfer arm.

11. An apparatus in accordance with claim 1 wherein said trimming means includes a means for clamping a cartridge at said trimming work station to prevent the rotation of the cartridge during the trimming process, a trimming head, said trimming head having a hollow interior for receiving a portion of said cartridge therein, an annular ring, and a plurality of holes in said annular ring forming cuttings edges for trimming flash from the cartridge.

12. Apparatus for producing plastic caulking cartridges, comprising:

a support plate;

a plurality of work stations at spaced locations about said support plate means for feeding plastic tubes to said support plate in an upright disposition wherein the longitudinal axis of the tubes is generally vertical;

a rotatable indexing plate for moving said tubes to said work stations;

means for rotating said indexing plate;

said indexing plate having means for holding said tubes in a plurality of spaced pairs;

means located at one of said work stations for spin welding a spout to one tube of a pair of said tubes to form a cartridge;

means located at a second work station for spin welding a spout to another tube of said last-mentioned pair of tubes to form a second cartridge;

means for supplying plastic spouts to each spin welding means;

means located at a third work station for trimming flash formed during the spin welding of a spout to a tube;

said trimming means trimming flash simultaneously from a pair of cartridges; and means located at a fourth work station for dispensing said cartridges.

13. Apparatus in accordance with claim 13 wherein said apparatus includes a second rotatable indexing plate for moving said tubes to said work stations disposed below said first indexing plate, said rotating means rotating said first and second indexing plates in unison, said holding means of said first indexing plate contacting said tubes adjacent their upper end and said second indexing plate having means contacting said tubes adjacent their lower ends for holding said tubes in a plurality of spaced pairs.

14. Apparatus in accordance with claim 13 wherein said first and second indexing plates have generally circular perimeters and said holding means of said first and second index plates are a plurality of arc-shaped cutouts, said cutouts being disposed in a plurality of spaced pairs, each pair being adapted to receive and hold a pair of tubes from said tube feeding means.

15. Apparatus in accordance with claim 14 wherein said feeding means includes a pair of endless belt conveyors having a plurality of cleats, one of said conveyors conveying tubes in an upright disposition to one of said cutouts of a pair of cutouts and the other of said conveyors conveying in an upright disposition tubes to the other of said cutouts of said last-mentioned pair of cutouts.

16. Apparatus in accordance with claim 12 wherein said feeding means includes a pair of endless belt conveyors for conveying said tubes in an upright disposition and in adjacent parallel paths, each conveyer having a plurality of cleats, the surface of said cleats for contacting said tubes being disposed in a generally vertical direction and means for dispensing said tubes in said conveyors whereby only one of said tubes is dispensed between adjacent cleats of each conveyor.

17. Apparatus in accordance with claim 16 wherein said tube dispensing means includes a generally vertically disposed conduit communicating with each conveyor, a pair of guide rails angled downwardly toward and in communication with each of said conduits, and finger means between each pair of guide rails for intermittently permitting one tube at a time to be dispensed to each of said conveyors.

18. Apparatus in accordance with claim 13 wherein each spin welding means includes a reciprocable and rotatable welding head, means for reciprocating each weld head, means for rotating each weld head, each weld head having a hollow interior for receiving a portion of a spout therein, vacuum application means communicating with each hollow interior for holding a spout to each weld head, a plurality of ratchet teeth on said each weld head adapted to mate with ratchet teeth on a spout, and a reciprocable clamp cooperating with said first indexing plate for grasping and preventing the rotation of a tube during spin welding.

19. Apparatus in accordance with claim 18 wherein said spout supplying means includes a transfer arm at each spin welding station reciprocable between a spout receiving position and a spout transfer position, in said spout receiving position the distal end of said transfer arm is adjacent a nozzle supply ramp and in said spout transfer position the distal end of said transfer arm is disposed below a weld head, and vacuum means communicating with said distal end of the transfer arm for holding a spout thereto.

20. Apparatus in accordance with claim 12 wherein said trimming means includes a pair of reciprocable and rotatable cutters, said cutters being disposed adjacent one another for trimming flash from pairs of cartridges, each cutter leaving a hollow interior for receiving a portion of a spout and annular cutting ring, each cutting ring having a plurality of holes therethrough, said holes forming cutting edges for trimming flash from said cartridges.

21. Apparatus in accordance with claim 12 wherein said cartridge dispensing means includes a pair of holes through said support plate and a movable blocking plate having a pair of holes therethrough, in a dispensing position, the holes of said blocking plate being in alignment with said support plate holes, and in a blocking position, said blocking plate covering the holes through said support plate, and a take-away conveyor for carrying away cartridges after the cartridges fall through the holes in the support plate and in the blocking plate, said take-away conveyor including an endless belt with a plurality of projections extending therefrom, each dispensed cartridge being received about one of said projections.

22. Apparatus for producing plastic caulking cartridges from plastic spouts and plastic tubes, comprising:
a plurality of work stations;
means for moving plastic tubes to said work stations in a vertical disposition;
means for feeding plastic tubes to said moving means;
said feeding means including a means for conveying said tubes in a generally horizontal disposition to a means for transferring said tubes to an endless conveyor belt and for moving said tubes from a horizontal to a vertical disposition whereby said tubes arrive at said endless conveyor belt in a vertical disposition;
means for spin welding a plastic spout to a plastic tube to form a plastic cartridge;
said spin welding means being located at one work station;
means for supplying plastic spouts to said spin welding means;
means for trimming off flash produced during spin welding;
said trimming means being located at another work station; and
means for dispensing said cartridge.

23. An apparatus in accordance with claim 22 wherein said transfer means includes a movable finger for releasing the tubes one at a time to said endless conveyor belt, said endless conveyor belt having a plurality of cleats extending from the belt, said cleats having their major faces disposed in a vertical direction to receive a tube in a vertical position between adjacent cleats.

24. An apparatus in accordance with claim 23 wherein said transfer means includes a generally vertically disposed conduit communicating with said conveyor belt, and a pair of guide rails angled downwardly toward and in communication with said conduit, said movable finger being disposed between said pair of guide rails.

25. Apparatus for producing plastic caulking cartridges from plastic spouts and plastic tubes, comprising:
means for spin welding a plastic spout to a plastic tube to form a plastic cartridge;
means for moving plastic tubes to said spin welding means;
said spin welding means including a reciprocable weld head, means for reciprocating said weld head, means rotating said weld head, and means for holding a spout to said weld head;
means for supplying plastic spouts to said spin welding means;
said spout supplying means including a ramp, a reciprocable transfer arm, means for reciprocating said transfer arm and means for holding a spout in an upright position on said transfer arm, said ramp being adapted to transfer a spout from a spout supply to said transfer arm and said transfer arm being adapted to transfer a spout from said ramp to said weld head; and
means for trimming off flash produced during spin welding.

26. An apparatus in accordance with claim 25 wherein said ramp includes a base member for supporting a base portion of a spout and a pair of spaced rods disposed above said base member for guiding a nozzle portion of a spout and said means for holding a spout in an upright position on the transfer arm includes means for supplying a vacuum to said transfer arm.

27. Apparatus for producing plastic caulking cartridges from plastic spouts and plastic tubes, comprising:
a plurality of work stations;
means for moving plastic tubes to said work stations;
said moving means including a rotatable indexing plate having means for grasping said tubes at a plurality of locations along the perimeter of said indexing plate, means for rotating said indexing plate and a support plate disposed below said indexing plate for slideably supporting the tubes in a vertical position upon one of their longitudinal ends;

means for feeding plastic tubes to said moving means;

means for spin welding a plastic spout to a plastic tube to form a plastic cartridge;

said spin welding means being located at one work station;

means for supplying plastic spouts to said spin welding means;

means for trimming off flash produced during spin welding;

said trimming means being located at another work station;

means for dispensing said cartridge; and said cartridge dispensing means being located at a third work station and including a hole in said support plate and means for selectively blocking said hole.

28. An apparatus in accordance with claim 27 wherein said blocking means includes a reciprocable plate having a hole therethrough and means for reciprocating said reciprocable plate between a position wherein said hole through said reciprocable plate is in alignment with said hole through said support plate and a position wherein said reciprocable plate blocks the hole through said support plate.

29. An apparatus in accordance with claim 28 including a take-away conveyor disposed at an elevation below said support plate and in alignment with said hole through said support plate, said take away conveyor including an endless belt with a plurality of projections extending therefrom, the open end of a cartridge falling to said take-away conveyor being received about a projection.

* * * * *